March 3, 1964　　　J. J. SHARP　　　3,123,776
VOLTAGE AMPLITUDE DETECTION APPARATUS
Filed April 13, 1960
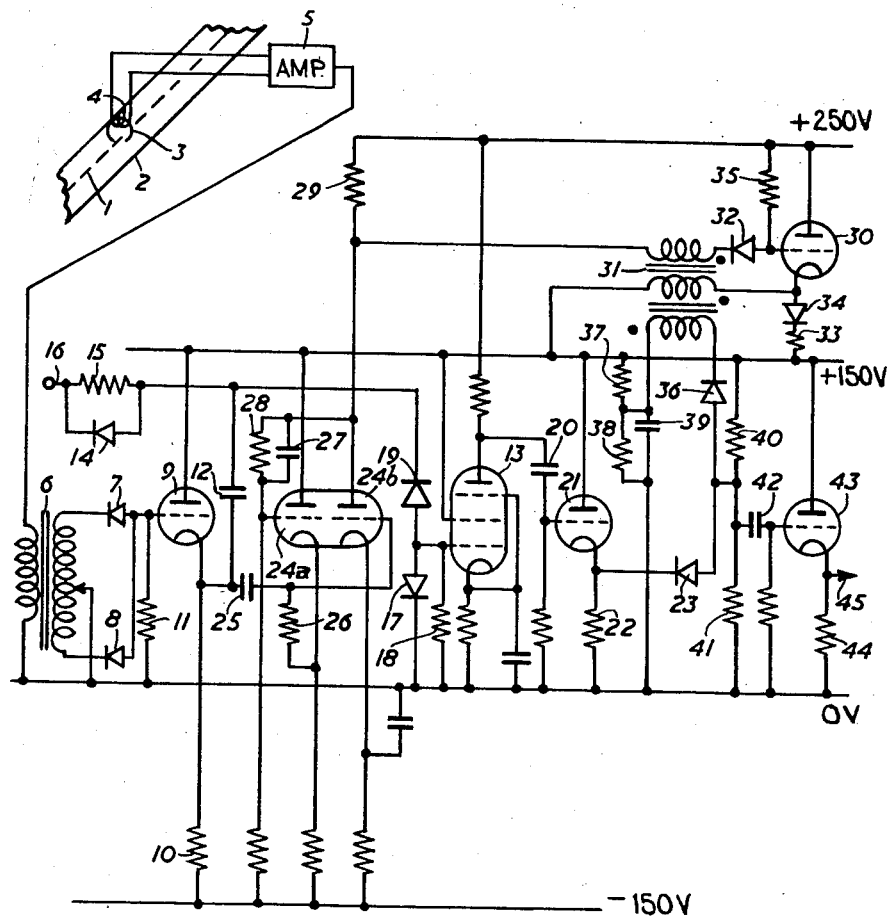
INVENTOR
JOHN JOSHUA SHARP
BY Hanne and Nydick
ATTORNEYS

United States Patent Office 3,123,776
Patented Mar. 3, 1964

3,123,776
VOLTAGE AMPLITUDE DETECTION APPARATUS
John Joshua Sharp, Woodley, near Romsey, England, assignor to International Computers and Tabulators Limited, London, England
Filed Apr. 13, 1960, Ser. No. 21,994
Claims priority, application Great Britain Apr. 24, 1959
6 Claims. (Cl. 328—116)

This invention relates to voltage amplitude detection circuits.

The objects of the invention is to provide an amplitude detection circuit which provides an output pulse each time a peak, which is greater than a predetermined amplitude occurs in an input signal.

According to the invention voltage amplitude detection apparatus comprises first amplitude detection means to produce a first output each time an input signal exceeds a reference level, peak detection means operative to produce a second output on each occurrence of a peak in the input signal of the same polarity as the reference level and means to generate an output indication when the first and second outputs are concurrent, whereby an ouput indication is generated only on the occurrence of a peak exceeding the reference level.

The invention will be described, by way of example, with reference to the accompanying drawing which is a schematic diagram of a peak detection circuit operated by signals read from magnetic tape.

Binary information signals recorded in a track 1 of a magnetic tape 2 are read by a magnetic sensing head 3. The voltage induced in head winding 4 is fed to the input of a conventional multi-stage amplifier 5. The output of the amplifier 5 is fed to the primary of a transformer 6. The centre tap of secondary of transformer 6 is grounded and the ends of the secondary are connected to a full wave rectification circuit consisting of diodes 7 and 8. The output from diodes 7 and 8 is applied to the grid of cathode follower 9, of which the anode is connected to a positive supply of 150 volts and the cathode is connected through load resistor 10 to a negative supply. The grid is returned to ground through resistor 11. Thus the input signal is formed to a unidirectional negative-going waveform and is applied to the input of cathode follower 9. This unidirectional waveform may be produced alternatively by feeding the output of the amplifier 5 in anti-phase to the grids of two valves which are biased to cut-off and have a common output load.

The output waveform from the cathode of cathode follower 9 is A.C. coupled through condenser 12 to a squaring stage comprising pentode valve 13. The squaring stage includes a conventional D.C. restorer consisting of diode 14 and resistor 15 which D.C. restores the waveform to a positive reference level determined by a reference voltage applied over line 16. A second diode 17 is connected in parallel with resistor 18 between ground and the control grid of valve 13, whereby the grid voltage of valve 13 is prevented from going positive with respect to ground. A third diode 19, connected between D.C. restorer diode 14 and diode 17, conducts only when the input signal is negative with respect to the grid of valve 13. That is to say, only those portions of the input signal which have an amplitude greater than the voltage difference between ground and the reference level are appiled to the grid of valve 13. Valve 13 is normally conducting and only those portions of the input signal above mentioned are operative to drive the value to cut-off and thus produce positive going square pulses at the anode thereof. These pulses are fed through condenser 20 to the grid of cathode follower 21 which consists of a triode having a cathode load 22 connected to ground.

The output from cathode follower 21 is fed to one diode 23 of an AND gate which will be described hereinafter.

The output waveform from the cathode follower 9 is fed also to the input of a differentiating amplifier consisting of a circuit of the kind described in chapter 18 of volume 19 of the Radiation Laboratory Series published by McGraw-Hill Book Company Inc. The circuit consists of an amplifying valve 24b to the grid of which the waveform is fed through differentiating circuit consisting of capacitor 25 and resistor 26. Valve 24a is connected as a cathode follower and is connected in a feedback loop from the anode of valve 24b to the differentiating circuit. A coupling network consisting of capacitor 27 and resistor 28 connects the anode of valve 24b to the input of valve 24a. The anode of valve 24b is connected through a load resistor 29 to a positive supply of 250 volts.

The output from the anode of valve 24b of the differentiating amplifier consists of a waveform which is centered about 150 volts and is the differential of the input waveform. Thus the output waveform passes through 150 volts in a negative direction once for each peak in the input waveform. This output waveform is applied to the input of a conventional multiar circuit consisting of a triode 30 having a transformer 31 between cathode and grid providing a positive feedback path. The construction and operation of a multiar circuit is described in detail in chapter 9 of volume 19 of the Radiation Laboratory Series published by McGraw-Hill Book Company Inc.

The anode of the triode 30 is connected to a 250 volt positive supply and the cathode is connected to the 150 volt positive supply through the primary of transformer 31 and cathode resistor 33 and diode 34 in parallel. The grid is connected through a resistor 35 to the 250 volt supply. The valve 30 normally is conducting with the grid thereof at approximately 150 volts. When the anode of valve 24b is positive with respect to the grid of multiar triode 30, the diode 32 is non-conductive. However when the anode of valve 24b goes negative with respect to the 150 volt supply, the diode 32 will be rendered conductive and the output from valve 24b will be passed to the grid of multiar triode 30. The feedback path is closed by the conductive diode 32, the triode 30 is cut-off rapidly and a pulse is produced in tertiary winding of the feedback transformer 31. Thus the multiar circuit provides an output pulse each time the input waveform to the multiar passes through 150 volts in the negative direction, that is to say each time a peak occurs in the input to transformer 6.

One end of the teriary winding of transformer 31 is connected to the second diode 36 of the above mentioned AND gate and the other end of this winding is connected to a voltage dividing network consisting of resistors 37, 38 and capacitor 39. The output ends of the diodes 23, 36 are connected together to a voltage divider consisting of resistors 40, 41 and through a capacitor 42 to the grid of triode 43 connected as a cathode follower with cathode load 44.

The AND circuit provides an output pulse only when it receives pulses concurrently from both the cathode follower 21 and the multiar transformer 31. Thus an output pulse occurs on the output line 45 from the cathode of cathode follower 43 only when the waveform from amplifier 5 exceeds the reference voltage level and a peak in the waveform occurs at this time.

I claim:

1. Apparatus for producing a final output signal in response to the application of an input signal only if the input signal contains a voltage peak greater than a predetermined level, said apparatus including a source of input signals; means responsive to an input signal initially converting input signals to signals of only one predetermined polarity; means for applying a resultant signal to two paths; a source of reference voltage of said predetermined polarity; means connected in one of said paths and responsive jointly to said reference voltage and to said resultant signal to produce an amplitude-indicating signal only if the amplitude of the resultant signal exceeds the reference voltage; a circuit connected in the other of said paths responsive only to the change in slope of the wave form of the resultant signal from one polarity to the opposite polarity to produce a peak-indicating signal; signal-combining means; and means for applying both said indicating signals to the signal-combining means.

2. Voltage amplitude detection apparatus including a source of unidirectional input signals; means for producing in response to each input signal an intermediate signal of proportionate amplitude and of predetermined polarity; a source of reference voltage of like polarity; amplitude detection means; means for applying said intermediate signal and said reference voltage to said amplitude-detecting means, said amplitude-detecting means being operative in response thereto to produce a first indicating signal only if the intermediate signal exceeds said reference voltage in amplitude; peak detection means for producing a second indicating signal if the slope of the wave form of a signal applied thereto changes from one polarity to the opposite polarity; means for applying said intermediate signal to said peak detection means; and signal-combining means responsive to the concurrent application of a pair of signals to produce a final signal; and means for applying said first and second indicating signals to said signal-combining means, whereby said signal-combining means produces a final signal only if an input signal contains a voltage peak having an amplitude greater than a predetermined voltage.

3. Voltage amplitude detection apparatus including a source of input signals having peaks of opposite polarities; means for producing an intermediate signal of predetermined polarity in response to an input signal of either polarity, said intermediate signal having an amplitude proportionate to the amplitude of the corresponding input signal; a source of reference voltage of like polarity to said intermediate signal; amplitude detection means; means for applying said intermediate signal and said reference voltage to said amplitude detection means, said amplitude detection means being operative in response thereto to produce a first indicating signal only if the amplitude of the intermediate signal exceeds the reference voltage; peak detection means for producing a second indicating signal if the slope of the wave form of a signal applied thereto changes from one polarity to the opposite polarity; means for applying said intermediate signal to said peak detection means; signal-combining means responsive to the concurrent application of a pair of signals to produce a final signal, and means for applying said first and second indicating signals to said signal-combining means whereby said signal-combining means produces a final signal only if an input signal contains a voltage peak having an amplitude greater than a predetermined voltage.

4. Voltage amplitude detection apparatus including a source of input signals; means responsive to an input signal for producing an intermediate signal of predetermined polarity having an amplitude proportionate to the input signal; a source of reference voltage of said predetermined polarity; amplitude detection means; means for applying said intermediate signal and said reference voltage to said amplitude detection means, said amplitude detection means being operative in response thereto to produce a first indicating signal only if the amplitude of the intermediate signal exceeds the reference voltage; signal-differentiating means operative in response to an applied signal to produce an output wave form crossing zero voltage level; means for applying said intermediate signal to the signal-differentiating means; circuit means connected to said signal-differentiating means operative to produce a second indicating signal when said output wave form crosses zero voltage level; and signal-combining means responsive to the concurrent application of a pair of signals to produce a final signal; and means for applying said first and second indicating means to said signal-combining means.

5. Voltage amplitude detection apparatus including a source of input signals; means responsive to an input signal for producing an intermediate signal of predetermined polarity having an amplitude proportionate to the input signal; a source of reference voltage of said predetermined polarity; amplitude detection means; means for applying said intermediate signal and said reference voltage to said amplitude detection means, said amplitude detection means being operative in response thereto to produce a first indicating signal only if the amplitude of the intermediate signal exceeds the reference voltage; signal-differentiating means operative in response to an applied signal to produce an output wave form crossing zero voltage level; means for applying said intermediate signal to the signal-differentiating means; a multiar circuit, connected to said signal-differentiating means, operative to produce a second indicating signal when said wave form crosses zero voltage level; signal-combining means responsive to the concurrent application of a pair of signals to produce a final signal; and means for applying said first and second indicating signals to said signal-combining means.

6. Voltage amplitude detection apparatus including a source of input signals; a unidirectional cathode follower circuit responsive to an input signal to produce an intermediate signal of predetermined polarity having an amplitude proportionate to the input signal; a source of reference voltage of like polarity; a selection circuit coupled to the cathode follower circuit and to the reference voltage source operative to select those portions of the input signal exceeding the reference voltage; a signal-squaring circuit connected to the selection circuit operative to produce a first indicating signal as long as the input signal exceeds the reference voltage; a signal-differentiating circuit coupled to said cathode follower circuit operative to produce an output signal wave form in which the output signal crosses zero voltage level in a predetermined sense if a voltage peak occurs in the intermediate signal; a multiar circuit connected to said signal-differentiating means operative in response to said output signal wave form to produce a second indicating signal when the wave form crosses zero voltage level in said predetermined sense; and a signal-combining circuit coupled to said multiar device and to said signal-squaring circuit, operative in response to the concurrent application of said first and second indicating signals to produce a final output signal.

References Cited in the file of this patent
UNITED STATES PATENTS

| | | |
|---|---|---|
| 2,448,718 | Koulicovitch | Sept. 7, 1948 |
| 2,581,196 | Macpherson | Jan. 1, 1952 |
| 2,767,388 | Rust | Oct. 16, 1956 |
| 2,940,061 | Piety | June 7, 1960 |
| 2,952,811 | Carr | Sept. 13, 1960 |